United States Patent
Ward, III et al.

(10) Patent No.: US 7,822,954 B2
(45) Date of Patent: Oct. 26, 2010

(54) METHODS, SYSTEMS, AND COMPUTER PROGRAM PRODUCTS FOR RECOVERING FROM BRANCH PREDICTION LATENCY

(75) Inventors: John W. Ward, III, Pflugerville, TX (US); Khary J. Alexander, Poughkeepsie, NY (US); James J. Bonanno, Wappingers Falls, NY (US); Brian R. Prasky, Wappingers Falls, NY (US); Anthony Saporito, Highland, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/034,112

(22) Filed: Feb. 20, 2008

(65) Prior Publication Data

US 2009/0210684 A1    Aug. 20, 2009

(51) Int. Cl.
*G06F 9/38* (2006.01)
*G06F 9/42* (2006.01)
(52) U.S. Cl. .................... 712/239; 712/233
(58) Field of Classification Search ............ None
See application file for complete search history.

(56) References Cited

U.S. PATENT DOCUMENTS

| | | | |
|---|---|---|---|
| 6,260,138 B1* | 7/2001 | Harris | 712/239 |
| 7,254,700 B2* | 8/2007 | Levitan et al. | 712/239 |
| 7,490,210 B2* | 2/2009 | Klein | 711/169 |
| 7,657,723 B2* | 2/2010 | Klein | 711/169 |
| 2006/0130023 A1* | 6/2006 | Klein | 717/140 |
| 2007/0180438 A1* | 8/2007 | Suba | 717/151 |

\* cited by examiner

*Primary Examiner*—Eric Coleman
(74) *Attorney, Agent, or Firm*—Cantor Colburn LLP; John Campbell (57) ABSTRACT

A branch prediction algorithm is used to generate a prediction of whether or not a branch will be taken. One or more instructions are fetched such that, for each of the fetched instructions, the prediction initiates a fetch of an instruction at a predicted target of the branch. A test is performed to ascertain whether or not the prediction was generated late relative to the fetched instructions, so that if the branch is later detected as mispredicted, that detection can be correlated to the late prediction. When the prediction is generated late relative to the fetched instructions, a latent prediction is selected by utilizing a fetching initiated by the latent prediction such that a new fetch is not started.

24 Claims, 5 Drawing Sheets

METHODS, SYSTEMS, AND COMPUTER PROGRAM PRODUCTS FOR RECOVERING FROM BRANCH PREDICTION LATENCY

BACKGROUND OF THE INVENTION

This invention relates generally to pipelined processors and, more particularly, to methods, systems, and computer program products for recovering from branch prediction latency.

Modern processors use pipelining techniques to execute instructions at very high speeds. A pipeline is roughly analogous to an assembly line. On an automobile assembly line, many interrelated steps need to be performed in order to construct a new car. These steps are typically performed in parallel, such that a given step is performed on a plurality of different cars at substantially the same time. In a processor pipeline, each step completes a part of an instruction. Like the assembly line, different steps are completing different parts of different instructions in parallel. Each of these steps is called a pipe stage. The stages are connected, one to the next, to form a pipe where instructions enter at one end, progress through the stages, and exit at the other end. A pipeline is most effective if it can process a steady stream of instructions in a sequential manner.

As part of continuing efforts to increase the performance of central processing units (CPUs), instruction-level parallelism has been increasingly employed, in part, by deepening instruction pipelines. However, one consequence of a deeper pipeline is greater susceptibility to losses in performance from having to flush instructions being processed in the pipeline (i.e., instructions that are "in flight" in the pipeline). Countering this deleterious effect of branch instructions on deeper pipelines is the use of branch prediction algorithms meant to predict whether or not a branch will be taken, and in response to this prediction, initiating a pre-fetching of an appropriate set of instructions into the pipeline. However, as pipelines become ever deeper, the stakes of lost performance due to an incorrect prediction become ever greater, and so the accuracy of branch prediction becomes ever more important.

More specifically, when a branch is executed, the value of an instruction pointer may be changed to something other than the current value of the pointer plus a predetermined fixed increment. If a branch changes the instruction pointer to an address of a branch target given by the branch instruction, the branch is considered to be a "taken" branch. On the other hand, if a branch does not change the value of the instruction pointer to the address of the branch target, then this branch is not taken. Knowledge of whether or not a branch will be taken, as well as the address of the branch target, typically becomes available when the instruction has reached the last or next to last stage of the pipe. Thus, all instructions that issued later than the branch—and hence not as far along in the pipe as the branch—are invalid. These later issued instructions are invalid in the sense that they should not be executed if the branch is taken, because the next instruction to be executed following the branch is the one at the target address. All of the time spent by the pipeline on these later issued instructions is wasted delay, thus significantly reducing the overall speed that can be achieved by the pipeline.

One existing method for dealing with branches is to use prediction logic, hardware within a processor, or both, to predict whether an address will result in a branch instruction being taken or not taken. Examples of such hardware include a 2-bit saturating counter predictor (see "Computer Architecture A Quantitative Approach", David A. Patterson and John L. Hennessy, 2nd Edition, Morgan Kauffman Publishers, pp. 262 271,), as well as a local history predictor which uses the past behavior (taken/not-taken) of a particular branch instruction to predict future behavior of the instruction. Another existing technique selects a final prediction at the output of a multiplexer from among a first prediction provided using a branch past history table and a second prediction provided using a global branch history table.

A shortcoming with existing branch prediction schemes is that a start-up penalty for the prediction logic is longer than the amount of time it takes for instructions to be fetched from an instruction cache. One consequence of this start-up penalty, also termed a latency penalty, is that from a fresh start, instruction fetch may get ahead of prediction and never allow prediction to catch up. This occurs in designs where the branch prediction logic acts in parallel with instruction fetch. Without performing the proper branch prediction in time, instruction fetch may proceed down the wrong path which, in turn, may lead to further fetch restarts. As a result, one latent prediction may start a train of incorrect predictions and be very detrimental to overall performance.

One known solution to prevent instruction fetch from proceeding down the wrong path is to stall fetch on a fresh start condition to allow branch prediction to catch up with the new fetch. This approach is detrimental to performance due to the added latency in the instruction fetch. Such an approach should only be utilized if performance analysis reveals that the performance gain in allowing the branch prediction to catch up with the fetch more than offsets this fetch delay. Accordingly, it would be advantageous to provide an enhanced branch prediction technique that overcomes the foregoing deficiencies.

BRIEF SUMMARY OF THE INVENTION

Exemplary embodiments include a method for recovering from branch prediction latency for a surprise-guessed-taken (SGT) branch. Instructions are delivered along a predicted path comprising a plurality of branches each having a predicted branch target from which one or more instructions are fetched. A surprise branch is received without an indication of the surprise branch being dynamically predicted. The surprise branch is identified as a branch that should be guessed taken. The surprise branch is signaled as an SGT branch by generating an SGT branch detected signal indicating that the delivery of instructions along the predicted path should cease and a refetch should be initiated. An SGT branch latency is detected by determining that the SGT branch is predicted as taken, but the prediction is generated too late relative to a fetch of the branch to alter a sequence of fetched instructions along the predicted path. In response to detecting the SGT branch latency, the SGT branch detected signal is blocked. The delivery of instructions continues along the predicted path.

Exemplary embodiments also include a method for recovering from branch prediction latency for a surprise-guessed-not-taken (SGNT) branch. Instructions are delivered along a predicted path comprising a plurality of branches each having a predicted branch target from which one or more instructions are fetched. A surprise branch is received without an indication of the surprise branch being dynamically predicted. The surprise branch is identified as a branch that should be guessed not taken. The surprise branch is determined as taken and, in response thereto, a branch wrong detected signal is generated indicating that the delivery of instructions along the predicted path should cease and a refetch should be initiated. An SGNT branch latency is detected by determining that the surprise branch is predicted as taken, but the prediction is generated too late relative to a fetch of the branch to alter a sequence of fetched instructions along the predicted path. In response to detecting the SGNT branch latency, the branch wrong detected signal is blocked. The delivery of instructions continues along the predicted path.

Systems and computer program products corresponding to the above-summarized methods are also described and claimed herein. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

The detailed description explains the preferred embodiments of the invention, together with advantages and features, by way of example with reference to the drawings.

DETAILED DESCRIPTION OF EXEMPLARY EMBODIMENTS

An exemplary embodiment of the present invention avoids the need to restart branch prediction logic when a misprediction is perceived at a downstream logic circuit or elsewhere. The technical effects and benefits include allowing the fetching of instructions to proceed forward in the presence of a perceived misprediction while eliminating a time delay penalty attributable to branch prediction restart.

Figure 1:
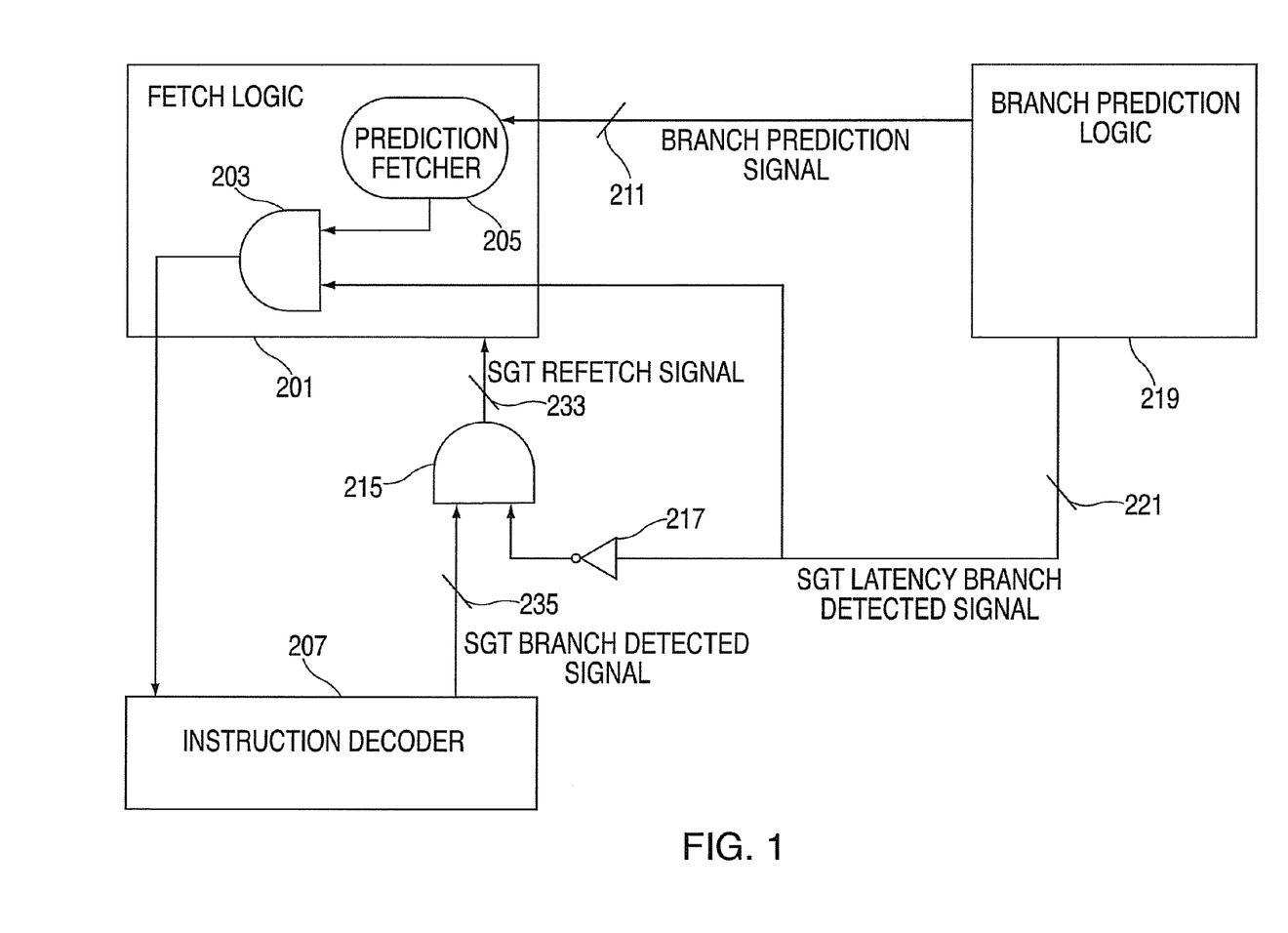
FIG. 1 is a block diagram setting forth a first illustrative system for recovering from branch prediction latency.

FIG. 1 is a block diagram setting forth a first illustrative system for recovering from branch prediction latency. A fetch logic 201 includes a prediction fetcher 205 operatively coupled to a first input of an AND gate 203. The prediction fetcher 205 receives a branch prediction signal 211 from a branch prediction logic 219. The branch prediction signal 211 is indicative of a branch prediction generated by the branch prediction logic 219. An output of AND gate 203 is operatively coupled to an input of an instruction decoder 207 for decoding instructions that have been fetched by the fetch logic 201.

When the instruction decoder 207 identifies a surprise-guessed-taken (SGT) branch that should have been taken, the instruction decoder 207 generates a surprise-guessed-taken (SGT) branch detected signal 235. The SGT branch detected signal 235 is operatively coupled to a first input of an AND gate 215. When the branch prediction logic 219 detects an SGT branch latency, the branch prediction logic 219 generates an SGT latency branch detected signal 221. The SGT latency branch detected signal 221 is operatively coupled to a second input of the AND gate 203. The SGT latency branch detected signal 221 is also operatively coupled to an input of an inverter 217. An output of the inverter 217 is operatively coupled to a second input of the AND gate 215. The output of the AND gate 215 represents an SGT refetch signal 233 which is fed to the fetch logic 201. Thus, the SGT latency branch detected signal 211 blocks the SGT branch detected signal 235 generated by the instruction decoder 207, thereby preventing generation of the SGT refetch signal 233.

Figure 2:
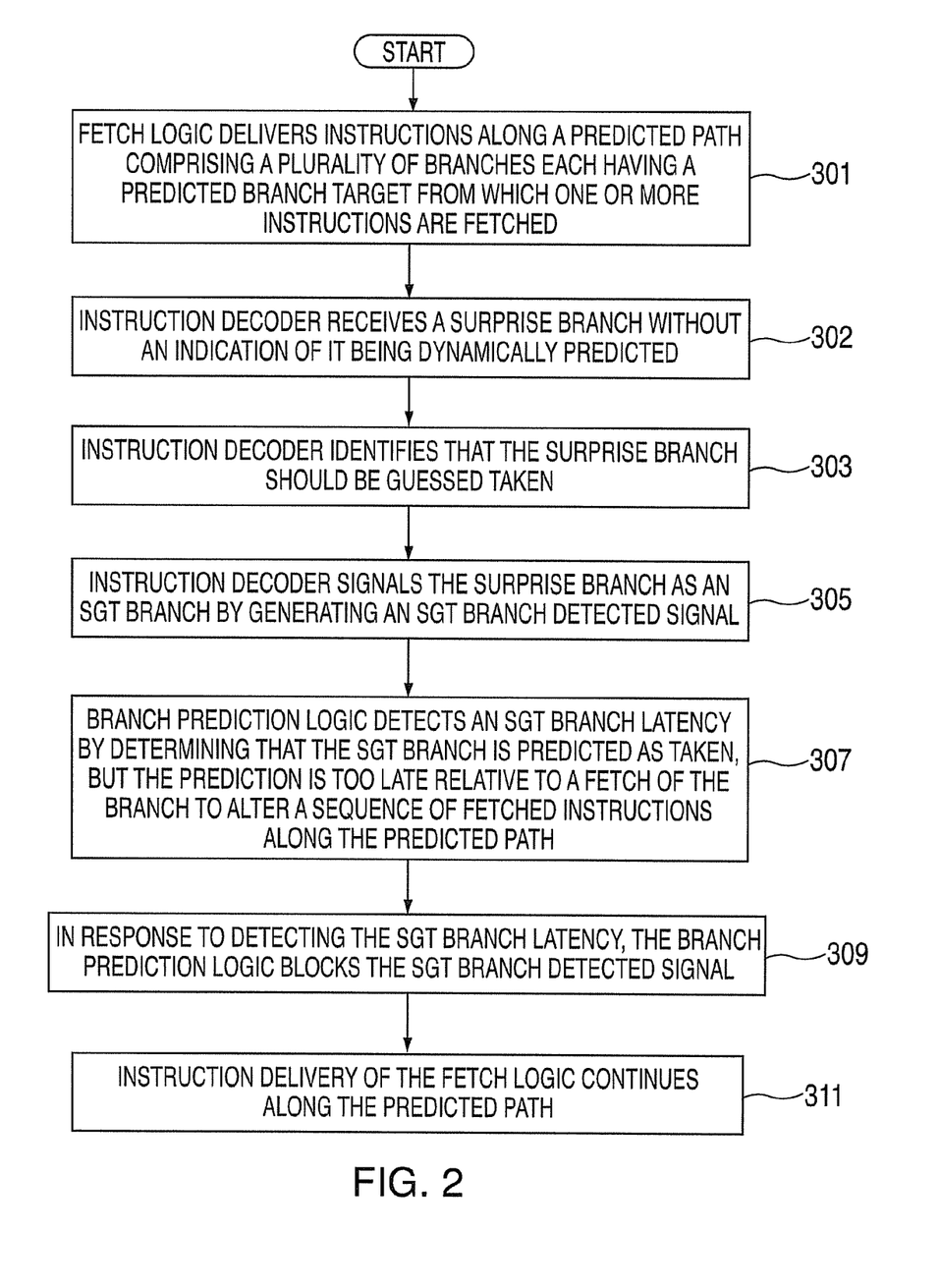
FIG. 2 is a flowchart setting forth a first illustrative operational sequence for recovering from branch prediction latency using the system of FIG. 1.

FIG. 2 is a flowchart setting forth a first illustrative operational sequence for recovering from branch prediction latency using the system of FIG. 1. The operational sequence of FIG. 2 is applicable in scenarios where a latent SGT branch is resolved to be taken. The branch is predicted as taken, but the prediction is too late relative to the branch's fetch. The operational sequence commences at block 301 where the fetch logic 201 (FIG. 1) delivers instructions along a predicted path comprising a plurality of branches each having a predicted branch target from which one or more instructions are fetched. Next, at block 302 (FIG. 2), the instruction decoder 207 (FIG. 1) receives a surprise branch without an indication of it being dynamically predicted. At block 303 (FIG. 2), the instruction decoder identifies that the surprise branch should be guessed taken.

Next, at block 305, the instruction decoder signals the surprise branch as an SGT branch by generating the SGT branch detected signal 235 (FIG. 1). Using prior art approaches, this SGT branch detected signal 235 would be utilized to cause the fetch logic 201 to restart fetching from the branch's target and would restart the branch prediction logic 219. Thus, the SGT branch detected signal 235 indicates that the delivery of instructions along the predicted path should cease and a refetch should be initiated. However, the system of FIG. 1 recognizes that, under the foregoing circumstances described with reference to blocks 301-305 (FIG. 2), the SGT branch detected signal 235 (FIG. 1) correlates to a latent branch prediction. Accordingly, at block 307 (FIG. 2), the branch prediction logic 219 (FIG. 1) detects an SGT branch latency by determining that the SGT branch is predicted as taken, but the prediction is too late relative to a fetch of the branch to alter a sequence of fetched instructions along the predicted path.

The operational sequence of FIG. 2 progresses to block 309 where, in response to detecting the SGT branch latency, the branch prediction logic 219 (FIG. 1) blocks the SGT branch detected signal 235. The blocking of the SGT branch detected signal 235 prevents a commencement of a new fetch or prevents a newly commenced fetch from continuing. Illustratively, block 309 (FIG. 2) is performed by producing the SGT latency branch detected signal 221 (FIG. 1). The SGT latency branch detected signal 221 is fed to an inverter 217 which inverts the SGT latency branch detected signal 221 and applies this inverted signal to the second input of the AND gate 215, thus blocking the SGT branch detected signal 235 generated by the instruction decoder 207.

At block 311 (FIG. 2), the branch prediction logic 219 (FIG. 1) applies the branch prediction signal 211 to the fetch logic 201, causing instruction delivery for the prediction fetcher 205 of the fetch logic 201 to continue along the predicted path. Thus, fetching is redirected to a fetch buffer that was assigned to fetch a target corresponding to the latent prediction. The branch prediction logic 219 is not restarted. Illustratively, the procedure of FIG. 2 may use a branch prediction algorithm to predict whether or not a branch will be taken. The procedure may, but need not, utilize a fetch buffer to store one or more instructions corresponding to the SGT branch latency.

Figure 3:
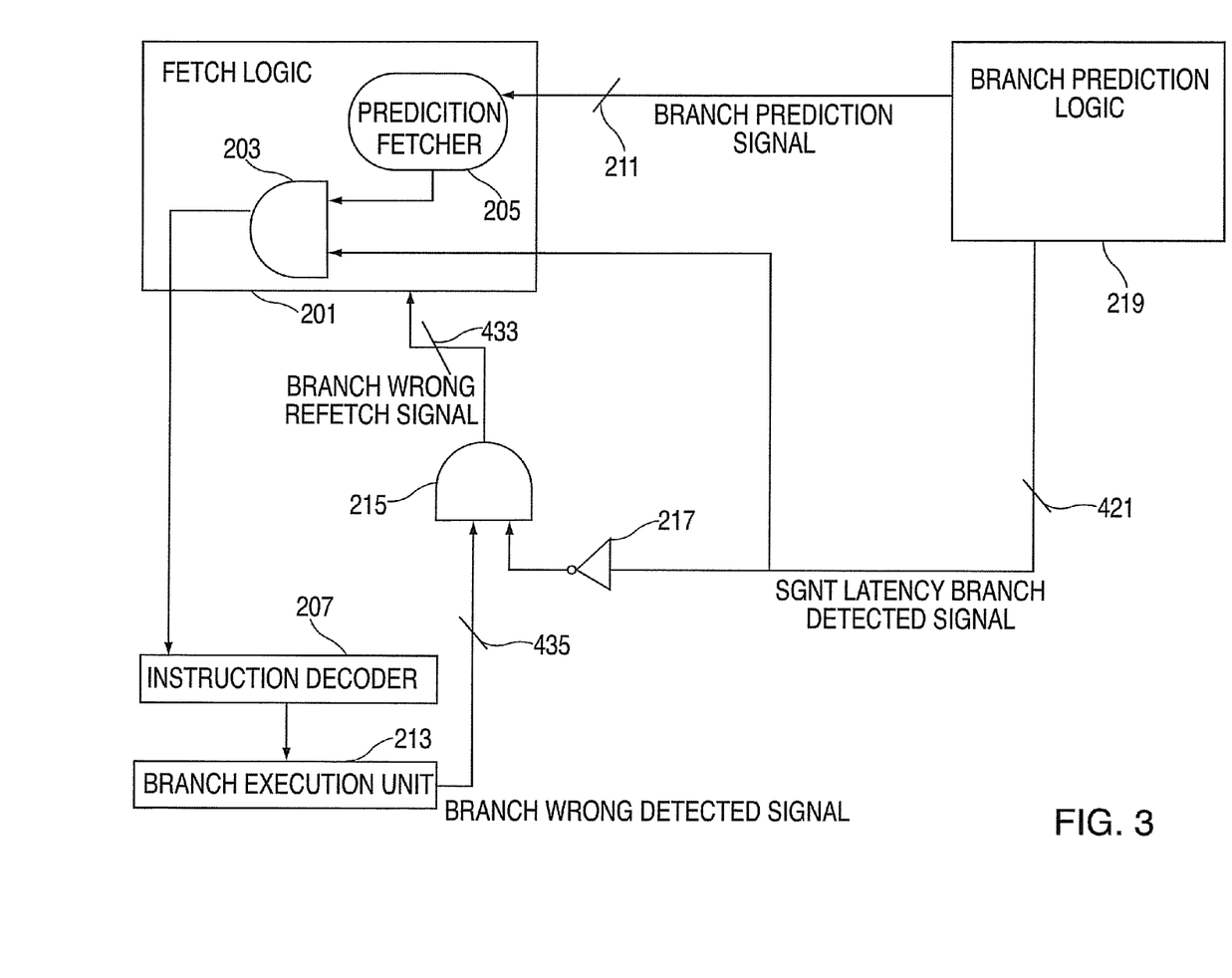
FIG. 3 is a block diagram setting forth a second illustrative system for recovering from branch prediction latency.

FIG. 3 is a block diagram setting forth a second illustrative system for recovering from branch prediction latency. The system of FIG. 3 is similar to the system of FIG. 1 in that both systems include a fetch logic 201 comprising a prediction fetcher 205 operatively coupled to a first input of an AND gate 203. The prediction fetcher 205 receives a branch prediction signal 211 from a branch prediction logic 219. The branch prediction signal 211 is indicative of a branch prediction generated by the branch prediction logic 219. An output of AND gate 203 is operatively coupled to an input of an instruction decoder 207 for decoding instructions that have been fetched by the fetch logic 201.

In the system of FIG. 3, the instruction decoder 207 identifies a latency branch that was predicted taken, but the prediction was made too late relative to an instruction fetch, and the branch was marked as a surprise-guessed-not-taken (SGNT) branch that is resolved taken. In this situation, using a prior art system, a mismatch between the surprise indication (not taken) and the taken resolution would cause the fetch logic 201 to redirect. However, since the branch was guessed taken, the fetch logic 201 is, in fact, already fetching instructions at the proper branch target. Accordingly, the system of FIG. 3 blocks the redirect from the branch prediction logic 219 and instead fetches down a predicted taken path of branches.

An output of the instruction decoder 207 is operatively coupled to an input of a branch execution unit 213. An output of the branch execution unit 213 is operatively coupled to a first input of an AND gate 215. When the branch execution unit 213 generates a branch wrong detected signal 435 and the branch prediction logic 219 detects an SGNT branch latency, the branch prediction logic 219 generates an SGNT latency branch detected signal 421. The SGNT latency branch detected signal 421 is operatively coupled to a second input of the AND gate 215. The SGNT latency branch detected signal 421 is also operatively coupled to an input of an inverter 217. An output of the inverter 217 is operatively coupled to a second input of the AND gate 215. The output of the AND gate 215 represents a branch wrong refetch signal 433 which is fed to the fetch logic 201. Thus, the SGNT latency branch detected signal 421 blocks the branch wrong detected signal 435 generated by the branch execution unit 213, thereby preventing generation of the branch wrong refetch signal 433.

Figure 4:
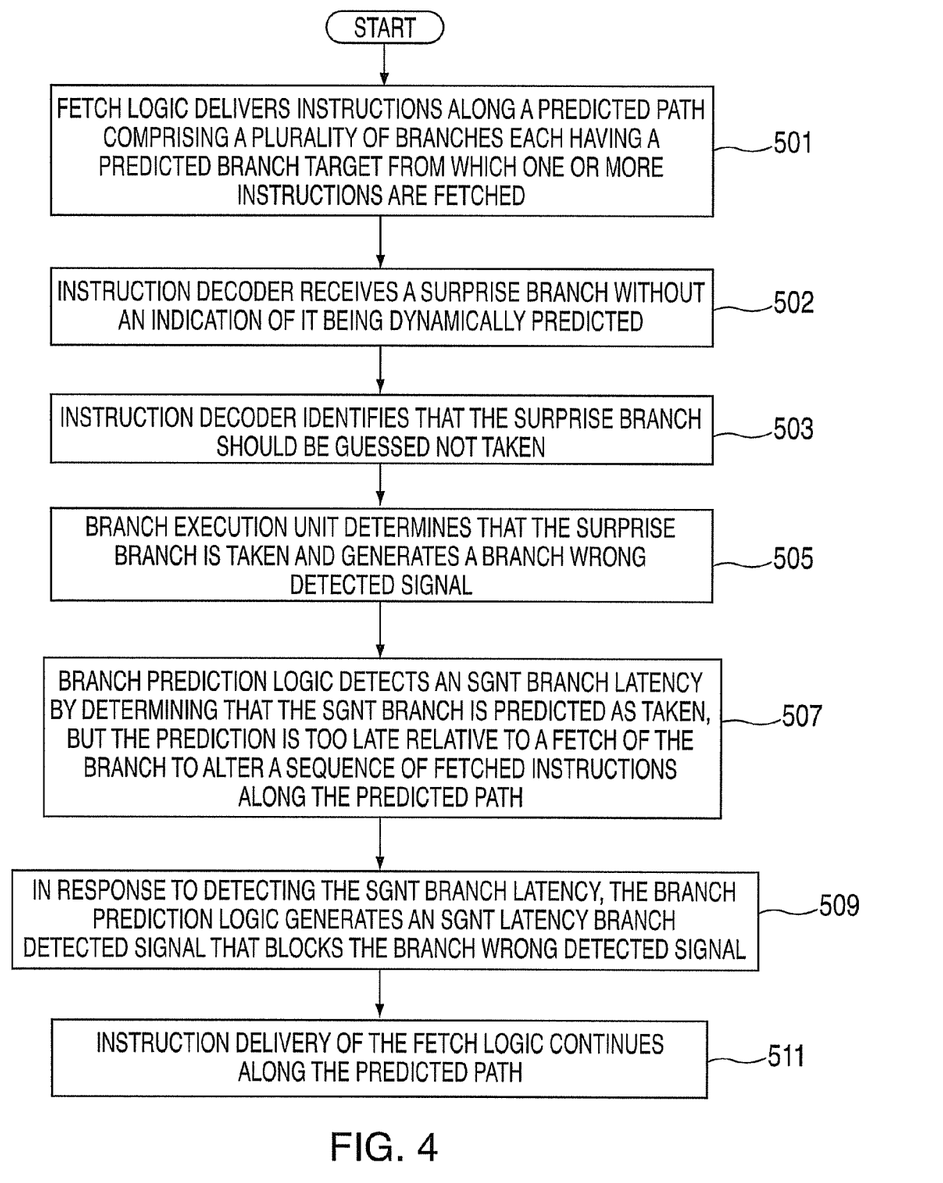
FIG. 4 is a flowchart setting forth a second illustrative operational sequence for recovering from branch prediction latency using the system of FIG. 3.

FIG. 4 is a flowchart setting forth a second illustrative operational sequence for recovering from branch prediction latency using the system of FIG. 4. The operational sequence of FIG. 4 is applicable in scenarios where a latency branch was predicted as taken, but the prediction was made too late relative to an instruction fetch, and the branch was marked as a surprise-guessed-not-taken (SGNT) branch that is resolved taken. In this situation, using a prior art system, a mismatch between the surprise indication (not taken) and the taken resolution would cause the fetch logic 201 (FIG. 3) to redirect. However, since the branch was guessed taken, the fetch logic 201 is, in fact, already fetching instructions at the proper branch target. Accordingly, the procedure of FIG. 4 blocks the redirect from the branch prediction logic 219 (FIG. 3) and instead fetches down a predicted taken path of branches.

The procedure of FIG. 4 commences at block 501 where the fetch logic 201 (FIG. 3) delivers instructions along a predicted path comprising a plurality of branches each having a predicted branch target from which one or more instructions are fetched. Next, at block 502 (FIG. 4), the instruction decoder 207 (FIG. 3) receives a surprise branch without an indication of it being dynamically predicted. At block 503 (FIG. 4), the instruction decoder identifies that the surprise branch should be guessed not taken. The branch execution unit 213 (FIG. 3) determines that the surprise branch is taken and, in response thereto, generates a branch wrong detected signal 435 at block 505 (FIG. 4). The branch wrong detected signal 435 (FIG. 3) indicates that the delivery of instructions along the predicted path should cease and a refetch should be initiated. However, the branch prediction logic 219 (FIG. 3) detects an SGNT branch latency at block 507 (FIG. 4) by determining that the surprise branch is predicted as taken, but the prediction is too late relative to a fetch of the branch to alter a sequence of fetched instructions along the predicted path. In response to detecting the SGNT branch latency, the branch prediction logic 219 (FIG. 3) generates an SGNT latency branch detected signal 421 that blocks the branch wrong detected signal (FIG. 4, block 509). The blocking of the SGNT latency branch detected signal 421 prevents a commencement of a new fetch or a continuation of a newly commenced fetch.

Illustratively, the branch wrong detected signal is blocked at block 509 by operatively coupling the branch wrong detected signal 435 (FIG. 3) to the first input of the AND gate 215. The SGNT latency branch detected signal 421 (FIG. 3) is inverted by the inverter 217 and the inverted signal is operatively coupled to the second input of the AND gate 215. An output of the inverter 217 is operatively coupled to a second input of the AND gate 215. The output of the AND gate 215 represents a branch wrong refetch signal 433 which is fed to the fetch logic 201. Thus, the SGNT latency branch detected signal 421 blocks the branch wrong detected signal 435 generated by the branch execution unit 213, thereby preventing generation of the branch wrong refetch signal 433.

After block 509 (FIG. 4) is performed, the procedure advances to block 511. The branch prediction logic 219 (FIG. 4) causes instruction delivery for the prediction fetcher 205 of the fetch logic 201 to continue along the predicted path. Illustratively, the procedure of FIG. 4 may use a branch prediction algorithm to predict whether or not a branch will be taken. The procedure may, but need not, utilize a fetch buffer to store one or more instructions corresponding to the SNGT latency branch.

Figure 5:
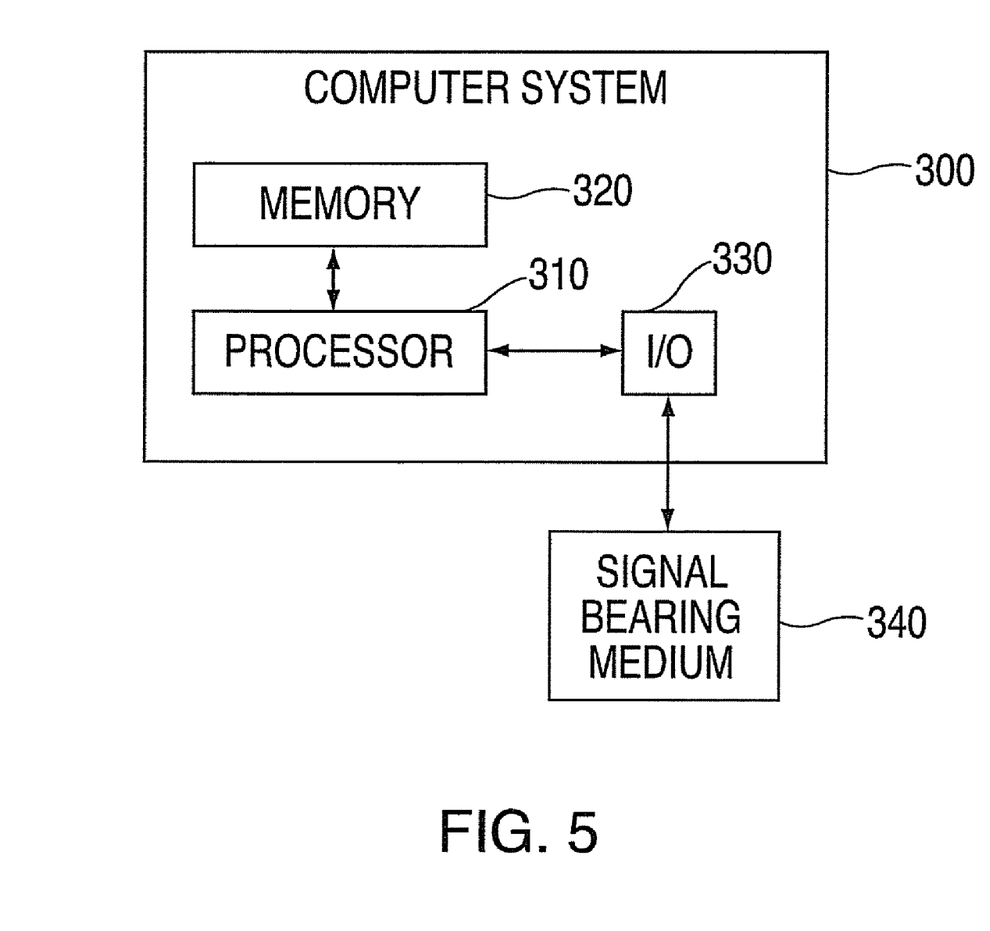
FIG. 5 is a block diagram setting forth an illustrative computer program product for recovering from branch prediction latency.

FIG. 5 is a block diagram setting forth an illustrative computer program product for recovering from branch prediction latency. The system includes a computer 300 operatively coupled to a signal bearing medium 340 via an input/output interface (I/O) 330. The signal bearing medium 340 may include a representation of instructions for recovering from branch prediction latency, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for recovering from branch prediction latency, wherein the information is represented, e.g., on the signal bearing medium 340 and communicated to the computer 300 via the I/O 330, wherein the processor 310 saves information as appropriate into a memory 320. Illustratively, the processor 310 corresponds to one or more of the fetch logic 201, instruction decoder 207, or branch prediction logic 219 shown in any of FIGS. 1 and 3. Alternatively, the processor 310 is not integrated with one or more of the fetch logic 201, the instruction decoder 207, and the branch prediction logic 219, but is implemented as a separate element that controls the operation of the fetch logic 201, the instruction decoder 207, and the branch prediction logic. Returning now to FIG. 5, this information may also be saved into the memory 320, e.g., via communication with the I/O 330 and the signal bearing medium 340.

The processor 310 implements a method for recovering from branch prediction latency for a surprise-guessed-taken (SGT) branch. Instructions are delivered along a predicted path comprising a plurality of branches each having a predicted branch target from which one or more instructions are fetched. A surprise branch is received without an indication of the surprise branch being dynamically predicted. The surprise branch is identified as a branch that should be guessed taken. The surprise branch is signaled as an SGT branch by generating an SGT branch detected signal. An SGT branch latency is detected by determining that the SGT branch is predicted as taken, but the prediction is generated too late relative to a fetch of the branch to alter a sequence of fetched instructions along the predicted path. In response to detecting the SGT branch latency, the SGT branch detected signal is blocked. The delivery of instructions is restored along the predicted path. The foregoing steps may be implemented as a program or sequence of instructions within the memory 320, or on a signal bearing medium, such as the medium 340, and executed by the processor 310.

The processor 301 also implements a method for recovering from branch prediction latency for a surprise-guessed-not-taken (SGNT) branch. Instructions are delivered along a predicted path comprising a plurality of branches each having a predicted branch target from which one or more instructions are fetched. A surprise branch is received without an indication of the surprise branch being dynamically predicted. The surprise branch is identified as a branch that should be guessed not taken. The surprise branch is determined as taken and, in response thereto, a branch wrong detected signal is generated. An SGNT branch latency is detected by determining that the SGNT branch is predicted as taken, but the prediction is generated too late relative to a fetch of the branch to alter a sequence of fetched instructions along the predicted path. In response to detecting the SGNT branch latency, the branch wrong detected signal is blocked. The delivery of instructions is restored along the predicted path. The foregoing steps may be implemented as a program or sequence of instructions within the memory 320, or on a signal bearing medium, such as the medium 340, and executed by the processor 310.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

We claim:

1. A computer implemented method for recovering from branch prediction latency for a surprise-guessed-taken (SGT) branch, the method comprising:
    delivering instructions along a predicted path comprising a plurality of branches each having a predicted branch target from which one or more instructions are fetched;
    receiving a surprise branch without an indication of the surprise branch being dynamically predicted;
    identifying, by a processor, the surprise branch as a branch that should be guessed taken;
    signaling the surprise branch as an SGT branch by generating an SGT branch detected signal indicating that the delivery of instructions along the predicted path should cease and a refetch should be initiated;
    detecting an SGT branch latency by determining that the SGT branch is predicted as taken, but the prediction is generated too late relative to a fetch of the branch to alter a sequence of fetched instructions along the predicted path;
    in response to detecting the SGT branch latency, blocking the SGT branch detected signal; and
    continuing the delivering of instructions along the predicted path.

2. The method of claim 1 wherein the blocking of the SGT branch detected signal is performed such that the refetch is not initiated.

3. The method of claim 1 further including using a branch prediction algorithm to predict whether or not a branch will be taken.

4. The method of claim 1 further comprising using a fetch buffer to store one or more instructions corresponding to the SGT branch latency.

5. A computer implemented method for recovering from branch prediction latency for a surprise-guessed-not-taken (SGNT) branch, the method comprising:
    delivering instructions along a predicted path comprising a plurality of branches each having a predicted branch target from which one or more instructions are fetched;
    receiving a surprise branch without an indication of the surprise branch being dynamically predicted;
    identifying, by a processor, the surprise branch as a branch that should be guessed not taken;
    determining the surprise branch as taken and, in response thereto, generating a branch wrong detected signal indicating that the delivery of instructions along the predicted path should cease and a refetch should be initiated;

detecting an SGNT branch latency by determining that the SGNT branch is predicted as taken, but the prediction is generated too late relative to a fetch of the branch to alter a sequence of fetched instructions along the predicted path;

in response to detecting the SGNT branch latency, blocking the branch wrong detected signal; and continuing the delivery of instructions along the predicted path.

6. The method of claim 5 wherein the blocking of the branch wrong detected signal is performed such that the refetch is not initiated.

7. The method of claim 5 further including using a branch prediction algorithm to predict whether or not a branch will be taken.

8. The method of claim 5 further comprising using a fetch buffer to store one or more instructions corresponding to the SGNT branch latency.

9. A system for recovering from branch prediction latency for a surprise-guessed-taken (SGT) branch, the system comprising:

an instruction fetcher for delivering instructions along a predicted path comprising a plurality of branches each having a predicted branch target from which one or more instructions are fetched;

an instruction decoder, operatively coupled to the instruction fetcher, for receiving a surprise branch without an indication of the surprise branch being dynamically predicted; the instruction decoder identifying the surprise branch as a branch that should be guessed taken and signaling the surprise branch as an SGT branch by generating an SGT branch detected signal indicating that the delivery of instructions along the predicted path should cease and a refetch should be initiated;

a branch prediction logic mechanism, operatively coupled to the instruction fetcher, for detecting an SGT branch latency by determining that the SGT branch is predicted as taken, but the prediction is generated too late relative to a fetch of the branch to alter a sequence of fetched instructions along the predicted path;

a blocking mechanism, operatively coupled to the branch prediction logic mechanism and the instruction decoder wherein, in response to detecting the SGT branch latency, the blocking mechanism blocks the SGT branch detected signal such that the delivering of instructions along the predicted path continues.

10. The system of claim 9 wherein the blocking of the SGT branch detected signal prevents a commencement of a new fetch by the instruction fetcher.

11. The system of claim 9 wherein the branch prediction logic mechanism uses a branch prediction algorithm to predict whether or not a branch will be taken.

12. The system of claim 9 further comprising a fetch buffer, operatively coupled to the instruction fetcher, for storing one or more instructions corresponding to the SGT branch latency.

13. A system for recovering from branch prediction latency for a surprise-guessed-not-taken (SGNT) branch, the method comprising:

an instruction fetcher for delivering instructions along a predicted path comprising a plurality of branches each having a predicted branch target from which one or more instructions are fetched;

an instruction decoder, operatively coupled to the instruction fetcher, for receiving a surprise branch without an indication of the surprise branch being dynamically predicted; the instruction decoder identifying the surprise branch as a branch that should be guessed not taken, and determining the surprise branch as taken and, in response thereto, generating a branch wrong detected signal indicating that the delivery of instructions along the predicted path should cease and a refetch should be initiated;

a branch prediction logic mechanism, operatively coupled to the instruction fetcher, for detecting an SGNT branch latency by determining that the SGNT branch is predicted as taken, but the prediction is generated too late relative to a fetch of the branch to alter a sequence of fetched instructions along the predicted path;

a blocking mechanism, operatively coupled to the branch prediction logic mechanism and the instruction decoder wherein, in response to detecting the SGNT branch latency, the blocking mechanism blocks the branch wrong detected signal such that the delivery of instructions along the predicted path continues.

14. The system of claim 13 wherein the blocking of the branch wrong detected signal prevents a commencement of a new fetch by the instruction fetcher.

15. The system of claim 13 wherein the branch prediction logic mechanism uses a branch prediction algorithm to predict whether or not a branch will be taken.

16. The system of claim 13 further comprising a fetch buffer, operatively coupled to the instruction fetcher, for storing one or more instructions corresponding to the SGNT branch latency.

17. A computer program product comprising a storage medium readable by a processing circuit and storing instructions for execution by the processing circuit for facilitating a method for recovering from branch prediction latency for a surprise-guessed-taken (SGT) branch, the method comprising:

delivering instructions along a predicted path comprising a plurality of branches each having a predicted branch target from which one or more instructions are fetched;

receiving a surprise branch without an indication of the surprise branch being dynamically predicted;

identifying the surprise branch as a branch that should be guessed taken;

signaling the surprise branch as an SGT branch by generating an SGT branch detected signal indicating that the delivery of instructions along the predicted path should cease and a refetch should be initiated;

detecting an SGT branch latency by determining that the SGT branch is predicted as taken, but the prediction is generated too late relative to a fetch of the branch to alter a sequence of fetched instructions along the predicted path;

in response to detecting the SGT branch latency, blocking the SGT branch detected signal; and continuing the delivering of instructions along the predicted path.

18. The computer program product of claim 17 wherein the blocking of the SGT branch detected signal is performed such that the refetch is not initiated.

19. The computer program product of claim 17 further including a branch prediction algorithm for predicting whether or not a branch will be taken.

20. The computer program product of claim 17 further comprising using a fetch buffer to store one or more instructions corresponding to the SGT branch latency.

21. A computer program product comprising a storage medium readable by a processing circuit and storing instructions for execution by the processing circuit for facilitating a method for recovering from branch prediction latency for a surprise-guessed-not-taken (SGNT) branch, the method comprising:

delivering instructions along a predicted path comprising a plurality of branches each having a predicted branch target from which one or more instructions are fetched;

receiving a surprise branch without an indication of the surprise branch being dynamically predicted;

identifying the surprise branch as a branch that should be guessed not taken;

determining the surprise branch as taken and, in response thereto, generating a branch wrong detected signal indicating that the delivery of instructions along the predicted path should cease and a refetch should be initiated;

detecting an SGNT branch latency by determining that the SGNT branch is predicted as taken, but the prediction is generated too late relative to a fetch of the branch to alter a sequence of fetched instructions along the predicted path;

in response to detecting the SGNT branch latency, blocking the branch wrong detected signal; and continuing the delivery of instructions along the predicted path.

22. The computer program product of claim 21 wherein the blocking of the branch wrong detected signal is performed such that the refetch is not initiated.

23. The computer program product of claim 21 further including a branch prediction algorithm for predicting whether or not a branch will be taken.

24. The computer program product of claim 21 further comprising using a fetch buffer to store one or more instructions corresponding to the SGNT branch latency.

* * * * *